Figures 1, 1A:
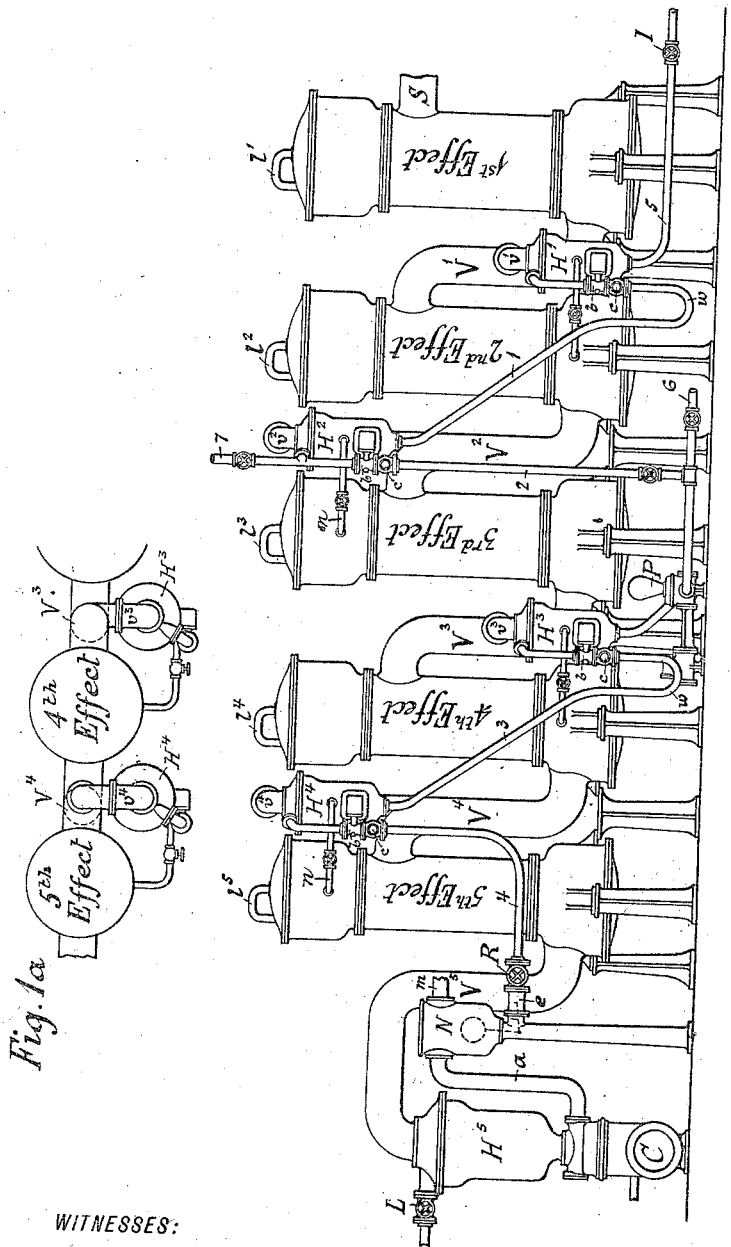

(No Model.)  2 Sheets—Sheet 1.

S. M. LILLIE.
CONDENSER WITH MULTIPLE EFFECT EVAPORATING APPARATUS.

No. 422,234.  Patented Feb. 25, 1890.

WITNESSES:

INVENTOR
S. Morris Lillie (No Model.) 2 Sheets—Sheet 2.

S. M. LILLIE.
CONDENSER WITH MULTIPLE EFFECT EVAPORATING APPARATUS.

No. 422,234. Patented Feb. 25, 1890.

WITNESSES:

INVENTOR
S. Morris Lillie

UNITED STATES PATENT OFFICE.

SAMUEL MORRIS LILLIE, OF PHILADELPHIA, PENNSYLVANIA.

CONDENSER WITH MULTIPLE-EFFECT EVAPORATING APPARATUS.

SPECIFICATION forming part of Letters Patent No. 422,234, dated February 25, 1890.

Application filed October 21, 1889. Serial No. 327,622. (No model.)

*To all whom it may concern:*

Be it known that I, SAMUEL MORRIS LILLIE, a citizen of the United States, residing at Philadelphia, in the county of Philadelphia and State of Pennsylvania, have invented a new and useful Combination of Condensers with Multiple-Effect Evaporating Apparatus, of which the following is a specification, reference being had to the accompanying drawings.

The object of my invention is to recover all or a portion of the heat used in evaporating a liquid in a multiple-effect evaporator in heating water or other liquid by the vapors from the several effects in succession in the order of their increasing temperatures, commencing with the vapor from the last or coolest effect, or with the vapors from the coolest effect whose vapors are hotter than the liquid which is to be heated.

My invention consists of a multiple-effect evaporating apparatus with a spray-condenser for each effect, each condenser being adapted and having the necessary connections to receive and condense vapors from the effect with which it is connected by means of a liquid which is passed through the condensers in succession, or by means of different liquids passed through the different condensers respectively. These "condensers" act as such for the vapors from their respective effects; but as regards the liquid passed through them they are "heaters."

In the drawings and specification a quintuple effect with condensers is shown and described in illustration of my invention.

Figure 3:
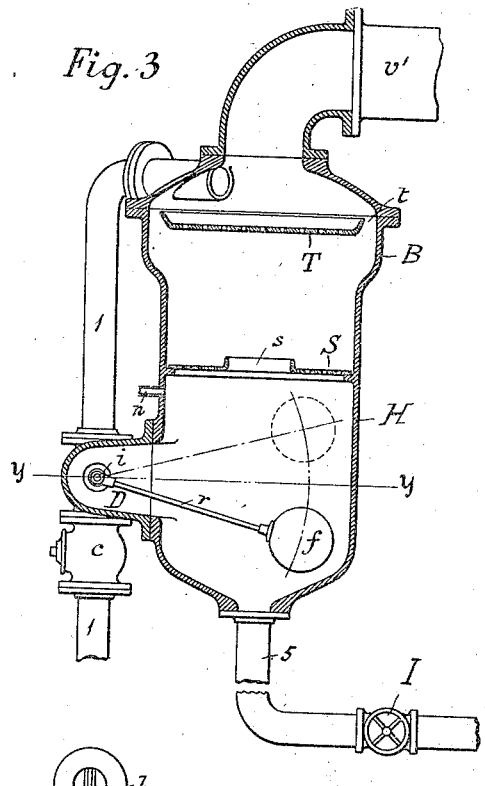
Figure 2:
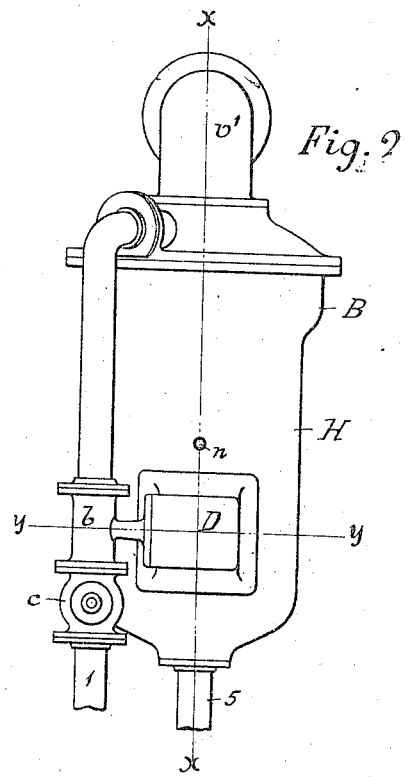
Figure 4:
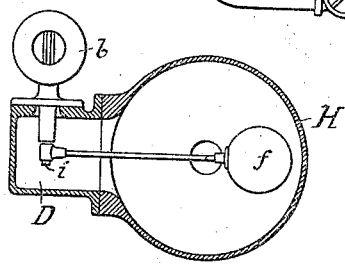
Figure 5:
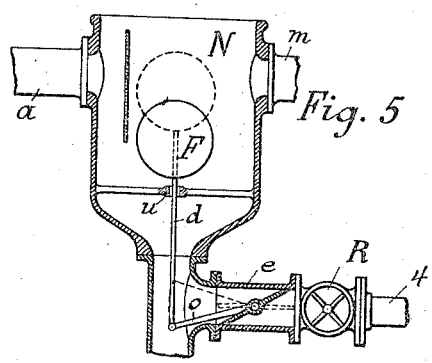

Of the drawings, Figure 1 is an elevation of a quintuple effect with combined spray-condensers H' to H$^5$—one for each effect. Fig. 1$^a$ is a plan view of two pans of a multiple effect with their condensers and connecting-pipes. Fig. 2 is an elevation of one of the spray-condensers. Fig. 3 is a section of Fig. 2 along the broken line $x\,x$. Fig. 4 is a section of Fig. 2 along the broken line $y\,y$, the butterfly-valve $b$ and its stem, however, not appearing in section in the figure. Fig. 5 is a vertical axial section through the overflow-tank N and of the pipes leading to and from it.

In the drawings, Fig. 1, a multiple effect consisting of five pans, respectively marked in the drawings "first effect," "second effect," &c., is shown with the usual condenser H$^5$ and vacuum-pump C for condensing the vapors of evaporation from the last or coolest effect and for maintaining therein a more or less perfect vacuum. Steam for causing evaporation in the system is supplied to the case of the first effect by the main S. The vapors due to evaporation are led from the first effect to the second, to produce evaporation therein, by the conduit V'; from the second to the third by the conduit V$^2$; from the third to the fourth by the conduit V$^3$; from the fourth to the fifth by the conduit V$^4$, and from the fifth effect to the condenser and vacuum-pump by the conduit V$^5$. The multiple effect has also suitable liquid-conducting pipes for delivering the liquid to be evaporated into the first effect and for conducting the partially-evaporated liquid from effect to effect down through the series, and finally as a concentrated product away from the fifth effect. Parts of these liquid-conducting pipes are shown as 1' 1$^2$, &c. Each effect is provided with the usual fittings, though omitted from the drawings as not being material to the explanation of the present invention—as, for example, air-vent-pipe connections between the vacuum-pump and the cases of the several effects and drip-pipes for taking away the waters of condensation from the same.

The mode of operation in this apparatus as a multiple effect is that common to all multiple effects—viz., the evaporation in the first effect is produced by heat from a source extraneous to the system, while evaporation in each of the other effects is caused by vapors supplied to it from the next hotter effect in the series, the pressure and temperature of the evaporation in the several effects diminishing from the first effect to the last effect, which is the one whose vapors pass to the condenser and vacuum-pump, and which is the coolest pan of the series.

To continue the explanation of the drawings, each of the higher effects, as well as the last effect, has a spray-condenser—*e. g.*, the fourth effect has a condenser H$^4$, with which its vapor-main V$^4$ communicates by the main $v^4$, and the third, second, and first effects have, respectively, the spray-condensers H$^3$ H² H′ similarly connected with their vapor-mains.

The condensers have suitable connecting-pipes between them, as hereinafter described, so that water (or other liquid) may be sent through the condensers in succession from condensers H⁵ to H′ and be heated to progressively higher temperatures by vapors from the several effects in succession. As the pressures increase with the increase of temperatures in the condensers from H⁵ to H′, means are provided, as hereinafter set forth, for delivering the liquid along from condenser to condenser against the said increase in pressure.

The spray-condensers connected with the effects are all of the construction illustrated in Figs. 2, 3, and 4, which, it will be supposed, represent heater H′ in Fig. 1.

Fig. 2 gives on a larger scale the same view of the condenser in which it appears in Fig. 1. The condenser consists of a vertical cylindrical case H, having a section B of an enlarged diameter at the top. A main v′ for the vapors to be condensed opens into the top of the condenser. A water-pipe 1 also delivers into the condenser at the top, and a water-escape pipe 5, fitted with a valve I, leads away from the condenser below. A tray T, having a diameter smaller than that of the interior of the section B of the condenser, and having a flat perforated bottom, is supported horizontally in the enlarged upper section B below the inlets from the vapor and water mains, and one or more shelves S, which may be of various constructions, for breaking and hindering the fall of the water used in the condenser, may be located in the latter below the tray T. I have shown in Fig. 2 one such shelf S, having a simple construction — namely, a horizontal perforated plate supported at its outer edges by the sides of the condenser and having an opening s. When a number of shelves S are employed, the openings s should break spaces with each other. The water-supply pipe 1 contains a butterfly-valve b, whose stem i extends horizontally into the interior of the small chamber D, which projects from the face of the condenser near the bottom of the same. Firmly fastened upon said stem is a rod r, which extends into the body of the condenser and terminates in the latter in a float f. The rod r and float f are capable of a vertical motion through a limited arc of a circle around the stem i of the butterfly-valve as a center. When the float is in its lowermost position, as indicated by the full lines, Fig. 3, the butterfly-valve is wide open; but when the float is in its uppermost position — that indicated by the circle in dotted lines — the butterfly-valve is tightly closed, so that no water can pass along the pipe 1 into the condenser. When the float occupies intermediate positions, the valve will be more or less open, depending upon the elevation of the float. The lower the float the wider open will be the valve. The water-supply pipe 1 is also fitted with a check-valve c, which prevents any flow of water or vapor backward — i. e., away from the condenser by the pipe 1. By the automatic operation of the float f and butterfly-valve b the flow of water through the pipe 1 into the condenser is maintained constantly equal to the flow of water away from the condenser by the pipe 5. Thus if while water is passing through the condenser the valve I in the pipe 5 be closed the level of the water will rise in the condenser, lifting with it the float f until the butterfly-valve is tightly closed and all influx of water into the condenser stopped. If now the valve I be opened to a degree to allow the water to flow away from the condenser, the level of the water in the latter, and with it the float f, will fall, thus opening the butterfly-valve until the inflow of water becomes just equal to the outflow, whatever the latter may be, after which the level of the water and the positions of the float and the butterfly-valve will remain stationary until a change occurs in the rate of outflow of water by the pipe 5, when an equal change will at once be made in the inflow of water by the rising or falling of the liquid-level and of the float f. The operation of this condenser is as follows: The vapors entering the same at the top by the main v′ flow downward through the annular passage t, left between the edge of the tray T and the walls of the bulge B of the condenser, and are condensed below the tray by the showering water, with the result of heating the latter, the water being delivered constantly from the pipe 1 upon the upper surface of the tray, through whose perforations it falls in a shower. Any water which may be delivered upon the tray in excess of what can pass through the perforations, owing to the latter having become clogged or what not, simply overflows the horizontal edge of the rim of the tray, and falling in an annular sheet assists in the condensing of the vapors, or does it all in case the perforations of the tray become entirely clogged.

The condensers each have an air-exhaust pipe n, which leads into the effect the next cooler than that to which the condenser belongs, or it may lead to the vacuum-pump direct. The purpose of these exhaust-pipes n is to permit the escape from the condensers of the air and other incondensable gases which may pass into them with the water and vapors.

In the combination of apparatus shown in Fig. 1 the liquid-eduction pipe of each condenser is the induction-pipe of the next hotter condenser, excepting in the case of the condenser H′ of the first effect whose eduction-pipe 5 is the final discharge-pipe for the system of condensers. The vacuum-pump C takes the water which passes through the condenser H⁵ of the fifth effect and delivers it, together with the air and other gases which may pass into the condenser, through the pipe a. This pipe a delivers into the small overflow and air-separating tank N, (see overflow-tank in vertical section in Fig. 5,) which at the bottom has an outlet-pipe 4, which is the liquid-induction pipe of the condenser $H^4$ of the fourth effect. This pipe 4 is fitted near the tank N with a butterfly-valve $e$, having an interiorly-located lever $o$, which projects toward the tank, and whose end has a jointed connection with a rod $d$, which extends vertically into the overflow-tank N and supports in the latter a float F, which rises and falls with the level of the liquid in tank N. When the float is in its lowermost position, as indicated by the full lines, Fig. 5, the valve $e$ is tightly closed and no water can pass from the tank through the pipe 4 into the condenser $H^4$, and when in its uppermost position, as shown by the dotted lines, the valve $e$ is wide open and water may flow from tank N through the pipe 4 unimpeded. The tank N is provided with an overflow $m$, and is placed at such an elevation that the normal partial vacuum in the condenser $H^4$ during the working of the apparatus will draw water from it into the condenser. The water-discharge pipe 3 of the condenser $H^4$ leads downward and delivers into the condenser $H^3$ of the third effect, which condenser is located sufficiently below the condenser $H^4$ so that water will flow from the latter into it against the greater pressure which exists in it (the condenser $H^3$) during the normal working of the apparatus. The condenser $H^2$ is placed in an elevated position, similar to condenser $H^4$, and a pump P is provided for taking liquid from the bottom of condenser $H^3$ and delivering it through the pipe 2 into the condenser $H^2$ against the greater pressure of the latter. The liquid-discharge pipe 1 of the condenser $H^2$ leads down into the condenser $H'$, which is placed sufficiently below the condenser $H^2$ so that the water or other liquid will flow of its own weight from the latter into it against the increased pressure in it. The liquid-eduction pipe 5 of condenser $H'$ leads away to a pump or tank, (not shown,) and is fitted with a valve I, which may be a hand-valve, as shown, or a valve automatically operated by the apparatus to which the pipe delivers, as is the case in the combination of apparatus shown and described in my pending application, Serial No. 324,362, filed September 18, 1889, for a patent for a "process of using heat in sugar-refineries."

It will be observed that in the drawings there are shown and in the preceding there have been described two methods of delivering liquid from one spray-condenser into the next against the greater pressure in the latter between the condensers $H^4$ and $H^3$. The means employed are gravity, the greater elevation of the condenser $H^4$, and the column of liquid in the connecting-pipe 3 between the condensers. The second method is used between the condensers $H^3$ and $H^2$, and also between the condensers $H^5$ and $H^4$—viz., a pump P in the former case and a pump C in the latter. Either method of delivering the liquid from condenser to condenser may be used. If pumps are employed, the condensers may all be placed at the same elevation. If gravity is relied upon, the condensers must be arranged in steps, with the hottest condenser the lowest and the coolest condenser the highest of the series.

I do not limit myself to any particular means of passing the liquid from condenser to condenser against the increasing pressures. The check-valves $c$ prevent a flow of vapor backward through a series of condensers, as from the condenser $H^3$ to the condenser $H^4$. Another means of preventing such backward flow of vapor is the U-bend $w$, with its concave side upward, shown in each of the pipes 3 and 1 leading, respectively, between the condensers $H^4$ and $H^3$ and between the condensers $H^2$ and $H'$. The water in these bends would serve as seals and prevent any backward flow of vapors even though no check-valve $c$ were used.

In the foregoing the valves automatically operated by the level of the liquid in the several condensers and in the tank N are referred to as "butterfly-valves;" but any valve adapted to the purpose may be used.

The operation of this apparatus in evaporating a liquid with the simultaneous heating of, say, water to nearly the temperature of the vapors from the hottest effect is as follows: The series of pans are worked as a multiple effect in the usual manner, steam or the heating agent, whatever it may be, entering the first effect at S, and the water-inlet valve L of the condenser $H^5$ being set so that, in conjunction with the vacuum-pump C, the inflowing water by condensing the vapors maintains in the last effect (the fifth effect in the apparatus shown) the desired degree of vacuum. The pump C takes the partially-heated water from the condenser of the last effect, together with the air and other gases which may enter the said condenser with the water and from the last effect, and delivers them through the pipe $a$ into the tank N, in which the air and gases separate from the water, and only the water continues on through the outlet-pipe 4 and through the series of condensers. It is apparent that some device for effecting this separation of gases from the water must be interposed between the condenser $H^5$ and the condenser $H^4$; otherwise the air and gases which enter condenser $H^5$ would be carried with the condensing-water back into the multiple-effect apparatus and prevent the maintaining of the proper degree of vacuum in the latter. The water delivered into the tank N raises the float $f$ in the latter, which opens the butterfly-valve $e$ in the pipe 4 and allows the water delivered by the pump C to flow along the pipe 4 into the condenser $H^4$, the water being drawn into the latter by the partial vacuum contained in it. As the tank N is necessarily partially filled with water during the working of the apparatus—i. e., water covers the mouth of the pipe 4—no air can possibly pass from the tank through the latter into the condenser H⁴. In the condenser H⁴ the partially-heated water from the condenser H⁵ is heated a certain number of degrees higher in condensing a part of the vapors from the fourth effect. From the condenser H⁴ the water continues by its own weight down through the pipe 3 into the condenser H³ of the third effect, and is still further heated in condensing a portion of the vapors from that effect. From the condenser H³ the pump P takes the water and delivers it into the condenser H² of the second effect, in which it receives another increase in temperature in condensing a part of the vapors from the second effect, and finally the water flows by its own weight down through the pipe 1 into the condenser H′ of the first and hottest effect, and receives in it its final increment of temperature in condensing a portion of the vapors from the first effect. From the condenser H′ the water flows away by the pipe 5, heated, may be, to within ten degrees or so of the temperature of the vapors from the first effect and at a rate which is regulated by the valve I. The valve I regulates the flow of water through the series of condensers exclusive of the condenser H⁵ of the last effect, and may cause it to be anything up to that of the water in the condenser H⁵ of the last effect. If the valve I is closed to a degree, diminishing the flow away from the condenser H′, the water sets back or rises in the latter until its float is raised sufficiently to correspondingly diminish the flow of water into it from the condenser H², in which the water then rises with its float until the water flowing from the condenser H³ into H² is also correspondingly diminished, and so it continues, the water rising in the condensers in succession from H′ to H⁴, inclusive, until finally the flow of water into the condenser H⁴ by the pipe 4 is lessened, and the flow of water into each condenser has the same rate as that of the water from the condenser H′ by the pipe 5 as fixed by the valve I. If, on the other hand, the valve I be opened to a degree, so as to increase the flow of water away from the condenser H′ of the first effect, the flow of water into each of the condensers from the preceding one is correspondingly increased by the falling of the water-level and of the float in each in turn from the condenser H′ to the condenser H⁴. If the volume of water delivered by the pump C through the pipe $a$ into the tank N is greater than is flowing away from the latter through the pipe 4, and thence from the condenser through the higher effects, the excess flows away from the tank N by the overflow $m$. The flow of water through the condenser H⁴ to H′ may be regulated by a valve R in the pipe 4, leading to the condenser H⁴, instead of by the valve I in the pipe 5, leading from the condenser H′, in which case the floats in the condensers H⁴ to H′ and the valves $b$, actuated by them, guard against the filling and overflowing of the condensers should a clogging of a connecting-pipe, or an unusual difference in pressure between two consecutive condensers, prevent the flow of water from condenser to condenser. As such overflows, with due care exercised, would seldom occur, the floats in the condensers and the valves $b$ might without much risk be dispensed with when the valve R in the pipe 4 is to be exclusively used in regulating the flow of liquid through the condensers.

As the condenser of each of the higher effects takes and condenses a portion of the vapors which are generated in its effect, it must follow, particularly when large quantities of water are passed through and heated in the condensers, that in each effect there will be a greater amount of evaporation effected than in the next lower effect, and the latter in consequence needs less evaporating-surface than the former, other things being equal. In the multiple effect shown in the drawings it will be seen that the sizes or diameters of the effects increase from the coolest one to the hottest one, which is intended to indicate that the evaporating-surfaces in the several effects increase in area from that in the coolest effect to that in the hottest effect—that is, the effect in which the greatest amount of liquid is evaporated has the most heating-surface and the others lesser areas, which are intended to be respectively approximately proportioned to the work they have to do.

When an apparatus is to be used constantly under uniform conditions as regards the degrees to which the liquid is to be concentrated and the quantity of it, and as regards the quantity of water or other liquid which is to be heated in the condensers, areas of heating-surfaces proper for the several pans may be calculated. This varying the areas of heating-surfaces in the pans of a multiple effect, when used in combination with a series of condensers, all as hereinbefore set forth, is one of the features of my present invention, and as regards this feature it is immaterial whether the condensers are spray or surface condensers.

A quintuple effect is illustrated in the drawings and referred to in this specification; but I do not limit the application of my invention to a multiple effect having five or any other specific number of pans. Again, I have described a single liquid (water) as passed through all the condensers in succession from the coolest to the hottest; but different liquids may be passed through the different condensers, or one liquid through part of the condensers in succession and another liquid through the remainder of the condensers in succession—as, for example, water may be passed through the condensers H⁵, H⁴, and H³, Fig. 1, and be taken away from the latter by the branch pipe 6, and a sugar solution may be heated in the condensers H² and H′ in succession, it entering the condenser H² by an independent supply-pipe 7 and leaving the condenser H' by the pipe 5.

Thus, having described my invention, I claim as mine and desire to secure to myself by Letters Patent of the United States—

1. The combination, with two pans of a multiple-effect evaporating apparatus, of a spray-condenser for the cooler of the two pans, connected with the pan by a vapor-conduit, a spray-condenser for the hotter of the two pans, connected with it by a vapor-main, a liquid-conducting pipe leading into the liquid-condenser of the cooler pan, a connecting liquid-conducting pipe leading from the condenser of the cooler pan into the condenser of the hotter pan, and means for moving liquid through the said connecting-pipe from the condenser of the cooler pan into the condenser of the hotter pan against the difference in pressure between the two, and a liquid-eduction pipe for the condenser of the hotter effect, substantially as specified.

2. The combination, with two of the pans of a multiple-effect evaporating apparatus, of a spray-condenser for the cooler pan of the two, connected with the pan by a vapor-conduit, a spray-condenser for the hotter pan, connected with it by a vapor-conduit and located sufficiently below the condenser of the cooler pan, so that water or other liquid to be passed through the condensers will flow by its own weight from the condenser of the cooler pan into the condenser of the hotter pan against a greater pressure in the latter condenser, a liquid-conducting pipe leading into the condenser of the cooler pan, a liquid-conducting pipe leading from the condenser of the cooler pan down into the condenser of the hotter pan, and a liquid-eduction pipe for the condenser of the hotter pan, substantially as specified.

3. The combination, with two pans of a multiple-effect evaporating apparatus, of a spray-condenser for the cooler of the two pans, connected with the pan by a vapor-conduit, a spray-condenser for the hotter of the two pans, connected with it by a vapor-conduit, a liquid-conducting pipe leading into the condenser of the cooler pan, a liquid-conducting pipe leading from the condenser of the cooler pan into the condenser of the hotter pan, means in the said liquid-conducting pipe for preventing the flow of liquid or vapor backward from the hotter condenser into the cooler condenser, and an eduction liquid-pipe for the condenser of the hotter pan, substantially as specified.

4. The combination, to form a multiple-effect evaporating and heating apparatus, of a number of evaporating-pans containing different areas of evaporating-surface, combined to form a multiple effect and arranged in the same in the order of their respective areas of heating-surface, the coolest effect having the smallest area of heating-surface and the hottest effect the greatest area of heating-surface, and spray or surface condensers with liquid supply and eduction pipes, in combination with the pans of the multiple effect, substantially as described, and operating to condense a part of the vapors from each of the hotter pans and a part or all of the vapors from the coolest pan in heating a liquid or liquids passed through the condensers, substantially as specified.

5. In a multiple-effect evaporating and heating apparatus, the combination, as adjacent pans in the series, of two pans having different areas of evaporating-surface, the hotter of the two pans having the greater area of evaporating-surface, and the combination, with the hotter of the two pans, of a spray or surface condenser having suitable liquid eduction and induction pipes, substantially as specified.

6. In a multiple-effect evaporating and heating apparatus, consisting of the pans of a multiple effect and of a series of spray-condensers, substantially as described, the combination, with the condenser of the last effect, and with the next hotter condenser of the system, of apparatus for separating air and other gases from the water which passes from the said condenser of the last effect into the said next hotter condenser of the system, substantially as specified.

7. In a multiple-effect evaporating and heating apparatus consisting of the combination of pans with connected condensers and water connecting-pipes between the condensers, substantially as specified, an eduction-pipe for the hottest condenser of the series, an induction-pipe for the coolest condenser of the series, fitted with a valve, a valve in the said eduction-pipe for the hottest condenser of the series, and intermediate pipes and mechanism connecting the said two valves and automatically operating to close the valve in the induction-pipe to the coolest condenser or to open the same in proportion as the valve in the eduction-pipe of the hottest condenser is closed or opened, substantially as specified.

S. MORRIS LILLIE.

Witnesses:
BUTLER KENNER HARDING,
JOHN GIBSON.